United States Patent
Mihály et al.

(10) Patent No.: US 11,470,502 B2
(45) Date of Patent: Oct. 11, 2022

(54) CONGESTION NOTIFICATION BY DATA PACKET FROM INTERMEDIATE NODE

(71) Applicant: Telefonaktiebolaget LM Ericsson (publ), Stockholm (SE)

(72) Inventors: Attila Mihály, Dunakeszi (HU); Szilveszter Nádas, Budapest (HU)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 16/956,342

(22) PCT Filed: Dec. 22, 2017

(86) PCT No.: PCT/EP2017/084441
§ 371 (c)(1),
(2) Date: Jun. 19, 2020

(87) PCT Pub. No.: WO2019/120569
PCT Pub. Date: Jun. 27, 2019

(65) Prior Publication Data
US 2020/0322837 A1  Oct. 8, 2020

(51) Int. Cl.
*H04L 1/00* (2006.01)
*H04W 28/02* (2009.01)
(Continued)

(52) U.S. Cl.
CPC ....... *H04W 28/0284* (2013.01); *H04L 47/115* (2013.01); *H04L 47/263* (2013.01)

(58) Field of Classification Search
CPC . H04W 28/0284; H04W 80/06; H04W 28/00; H04L 12/80; H04L 12/82;
(Continued)

(56) References Cited

U.S. PATENT DOCUMENTS

2008/0228933 A1*  9/2008  Plamondon ............. H03M 7/30
                                                      709/230
2011/0158096 A1*  6/2011  Leung ................... H04L 1/0079
                                                      370/232
(Continued)

FOREIGN PATENT DOCUMENTS

EP    2 731 373 A1    5/2014
EP    2 913 967 A1    9/2015
(Continued)

OTHER PUBLICATIONS

International Search Report and Written Opinion issued in international Application No. PCT/EP2017/084441 dated Aug. 14, 2018 (11 pages).
(Continued)

*Primary Examiner* — Abdelnabi O Musa
(74) *Attorney, Agent, or Firm* — Rothwell, Figg, Ernst & Manbeck, P.C.

(57) ABSTRACT

A node (110) of a communication network forwards a first data packet (301) from a server (150) to a client (10). Further, the node detects a congestion affecting the first data packet (301). Further, the node (110) generates at least one second data packet (306) addressed to the server (150). The at least one second data packet (306) indicates the detected congestion and comprises verification information enabling the server (150) to verify that the indicated congestion relates to the first data packet (301).

22 Claims, 7 Drawing Sheets

(51) Int. Cl.
*H04L 47/11* (2022.01)
*H04L 47/263* (2022.01)

(58) Field of Classification Search
CPC ........ H04L 47/11; H04L 47/31; H04L 47/115; H04L 47/263
See application file for complete search history.

(56) References Cited

U.S. PATENT DOCUMENTS

| | | | | |
|---|---|---|---|---|
| 2012/0213069 | A1* | 8/2012 | Oguchi | H04W 80/06 370/231 |
| 2014/0321289 | A1* | 10/2014 | Liu | H04L 47/31 370/237 |
| 2016/0344631 | A1* | 11/2016 | Krishnamurthy | H04L 47/11 |

FOREIGN PATENT DOCUMENTS

| | | |
|---|---|---|
| WO | 2018/077426 A1 | 5/2018 |
| WO | 2019/037852 A1 | 2/2019 |

OTHER PUBLICATIONS

B. Briscoe et al., "Low Latency, Low Loss, Scalable Throughout (L4S) Internet Service: Architecture draft-briscoe-tsvwg-14s-arch-01", Transport Area Working Group Internet-Draft Intended status: Informational, Expires: Sep. 1, 2017, Mar. 13, 2017 (24 pages).
Ericsson et al., "Efficient support of ECN in NR", 3GPP TSG-RAN WG2 #99, Tdoc R2-1709469, Berlin, Germany Aug. 21-25, 2017 (16 pages).
"Method for In-band Meta-data Transfer", Research Disclosure database No. 623051, Mar. 2016 (6 pages).
B. Trammell et al., "Path Layer UDP Substrate Specification" draft-trammell-plus-spec-00, Network Working Group, Dec. 23, 2016 (13 pages).

* cited by examiner

CONGESTION NOTIFICATION BY DATA PACKET FROM INTERMEDIATE NODE

CROSS REFERENCE TO RELATED APPLICATION(S)

This application is a 35 U.S.C. § 371 National Stage of International Patent Application No. PCT/EP2017/084441, filed on Dec. 22, 2017, designating the United States.

TECHNICAL FIELD

The present invention relates to methods for handling network congestions and to corresponding devices and systems.

BACKGROUND

In communication networks, it is known to convey data using data packets. In many cases such data packets are based on the Internet Protocol (IP) in connection with a transport protocol (TP), such as the Transmission Control Protocol (TCP) specified in IETF RFC 793 (September 1981).

Usage of the TCP typically allows for reliable transport of the data because the TCP also supports retransmission of lost data packets and congestion handling. One way of handling congestion using the TCP is to detect lost data packets and control the how the data packets are retransmitted.

Further, congestion handling may be based on Explicit Congestion Notification (ECN) as defined in RFC 3168 (September 2001). ECN allows end-to-end notification of network congestion without dropping packets. ECN is an optional feature that may be used between two ECN-enabled endpoints when the underlying network infrastructure also supports it. When ECN is successfully negotiated, an ECN-aware router may include an ECN marking in a header section of a data packet in order to signal a congestion without dropping the data packet. The receiver of the data packet echoes the congestion indication to the sender, which may react by reducing its transmission rate.

However, using dropping or ECN marking of data packets implies some latency until the sender can react to a signalled congestion, because the congestion indication is signalled to the receiver and then echoed to the sender.

U.S. Pat. No. 9,654,399 B2 describes a congestion control method in which an intermediate node forwards a data packet from a first network node to a second network node and includes congestion information into the forwarded data packet. The congestion information relates to a network path from the second network node to the first network node. In this way, notification of the congestion to the second network node can be accelerated. However, using this approach reliable congestion signalling may be problematic. For example, it may be difficult or even impossible for the intermediate node to properly relate the data packet forwarded from the first node to the second node to data packets on the network path from the second node to the first node. This may adversely affect reliability of the congestion signalling.

Accordingly, there is a need for techniques which allow for efficiently and reliably handling congestions in a communication network.

SUMMARY

According to an embodiment, a method of handling congestion in a communication network is provided. According to the method, a node of the communication network forwards a first data packet from a server to a client. Further, the node detects a congestion affecting the first data packet. Further, the node generates at least one second data packet addressed to the server. The at least one second data packet indicates the detected congestion and comprises verification information enabling the server to verify that the indicated congestion relates to the first data packet.

According to a further embodiment, a method of handling congestion in a communication network is provided. According to the method, a server sends a first data packet via a node of the communication network to a client. Further, the server receives at least one second data packet generated by the node of the communication network. The at least one second data packet indicates a congestion affecting the first data packet. Further, the server performs congestion control based on identifying, from verification information comprised in the second data packet, that the indicated congestion relates to the first data packet.

According to a further embodiment, a node for a wireless communication network is provided. The node is configured to forward a first data packet from a server to a client. Further, the node is configured to detect a congestion affecting the first data packet. Further, the node is configured to generate at least one second data packet addressed to the server. The at least one second data packet indicates the detected congestion and comprises verification information enabling the server to identify that the indicated congestion relates to the first data packet.

According to a further embodiment, a server is provided. The server is configured to send a first data packet via a node of a communication network to a client. Further, the server is configured to receive at least one second data packet generated by the node of the communication network and addressed to the server. The second data packet indicates a congestion affecting the first data packet. Further, the server is configured to perform congestion control based on identifying, from verification information comprised in the at least one second data packet, that the indicated congestion relates to the first data packet.

According to a further embodiment, a system is provided. The system comprises a server and a node of a communication network. The server is configured to send a first data packet via the node to a client. Further, the server is configured to receive at least one second data packet addressed to the server. The at least one second data packet indicates a congestion affecting the first data packet. Further, the server is configured to perform congestion control based on identifying, from verification information comprised in the second data packet, that the indicated congestion relates to the first data packet. The node is configured to forward the first data packet to the client. Further, the node is configured to detect the congestion affecting the first data packet and generate the at least one second data packet.

According to a further embodiment of the invention, a computer program or computer program product is provided, e.g., in the form of a non-transitory storage medium, which comprises program code to be executed by at least one processor of a node of communication network. Execution of the program code causes the node to forward a first data packet from a server to a client. Further, execution of the program code causes the node to detect a congestion affecting the first data packet. Further, execution of the program code causes the node to generate at least one second data packet addressed to the server. The at least one second data packet indicates the detected congestion and comprises verification information enabling the server to identify that the indicated congestion relates to the first data packet.

According to a further embodiment of the invention, a computer program or computer program product is provided, e.g., in the form of a non-transitory storage medium, which comprises program code to be executed by at least one processor of a server. Execution of the program code causes the server to send a first data packet via a node of a communication network to a client. Further, execution of the program code causes the server to receive at least one second data packet generated by the node of the communication network and addressed to the server. The second data packet indicates a congestion affecting the first data packet. Further, execution of the program code causes the server to perform congestion control based on identifying, from verification information comprised in the at least one second data packet, that the indicated congestion relates to the first data packet.

Details of such embodiments and further embodiments will be apparent from the following detailed description of embodiments.

DETAILED DESCRIPTION OF EMBODIMENTS

In the following, concepts in accordance with exemplary embodiments of the invention will be explained in more detail and with reference to the accompanying drawings. The illustrated embodiments relate to handling of congestions in a communication network. In the illustrated examples, it is assumed that the communication network is a wireless communication network, e.g., based on the LTE (Long Term Evolution) radio access technology specified by 3GPP (3$^{rd}$ Generation Partnership Project) or on the 5G (5$^{th}$ Generation) radio access technology currently developed by 3GPP. However, it is noted that other network technologies could be used as well, e.g., another wireless communication technology, such as WLAN (Wireless Local Area Network), or a wire based network technology, such as DSL (Digital Subscriber Line) or coaxial cable.

Figure 1:
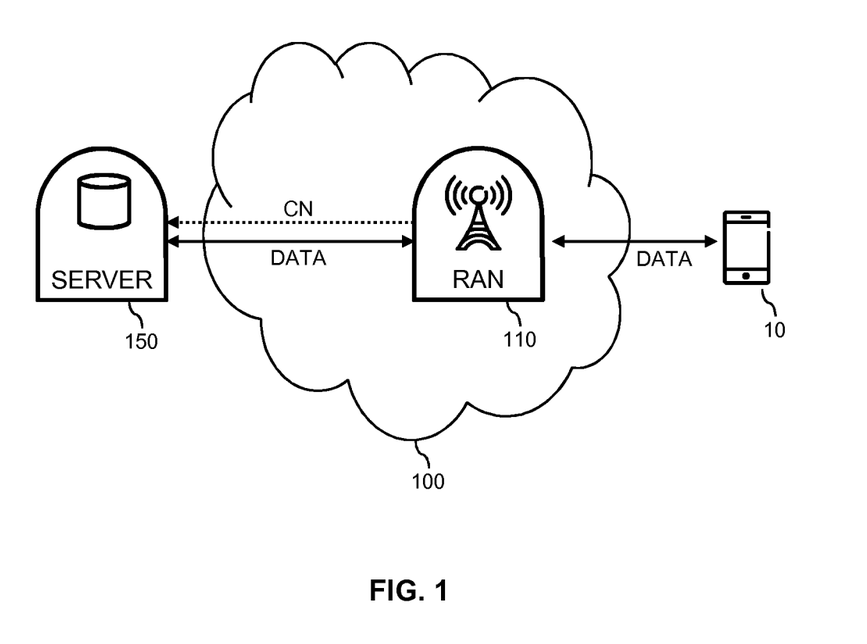
FIG. 1 schematically illustrates elements of a communication system according to an embodiment of the invention.

In the illustrated examples, it is assumed that data are conveyed by data packets, in particular IP data packets, from a server to a client. This is accomplished via an intermediate node, sometimes also referred to as "middlebox". The intermediate node may for example correspond to an access node of the communication network, e.g., an eNB (evolved Node B) of the LTE radio access technology or a gNB (next generation Node B) of the 5G radio access technology. The client may correspond to a UE (user equipment) connected to the communication network, e.g., a mobile phone, smartphone, a portable computer, a stationary computer, a multimedia device, or the like. An example of such scenario is shown in FIG. 1, where a server 150 communicates data via a communication network 100 to a client 10. The client 10 is assumed to be a UE which is wirelessly connected to a RAN (Radio Access Network) node 110 of the communication network. As mentioned above, the RAN node 110 may correspond to an eNB, a gNB, or similar type of access node. As can be seen, in the scenario of FIG. 1 the RAN node 110 acts as an intermediate node which forwards the data from the server 150 to the client 10.

As further illustrated, the client 10 may also transmit data to the server 150. These data may in particular include feedback data for acknowledging receipt of the data packets from the server 150, e.g., in the form of positive acknowledgement data packets (ACK data packets) and optionally also negative acknowledgement data packets (NACK data packets). In the example of FIG. 1, also the transmission of the data from the client 10 to the server 150 is accomplished via the intermediate node 110.

In the scenario of FIG. 1 a congestion may occur which affects the transport of the data packets from the server 150 to the client 10. The congestion may occur on a data path between the intermediate node 110 to the client 10, e.g., on a radio link connecting the intermediate node 110 and the client 10. This kind of congestion may for example result in increased fill level of one or more queues provided in the intermediate node 110 for temporarily storing the data packets to be forwarded to the client 10. The congestion may also occur on a data path between the server 150 and the intermediate node 110. In this case, a further intermediate node (not illustrated) arranged between the server 150 and the intermediate node 110 may already have marked one or more of the data packets which are received by the intermediate node 110 from the server 100 with a congestion indication, e.g., by ECN marking the data packet according to IETF RFC 3168.

In the illustrated concepts, it is assumed that the intermediate node 110 forwards a data packet from the server to the client and detects a congestion affecting the data packet. For example, the intermediate node 110 may detect that a data packet received from the server 150 is ECN marked or may detect that a fill level of a queue used for temporarily storing the data packet before forwarding to the client 10 is above a threshold. The intermediate node 110 indicates the detected congestion to the server by sending a congestion notification, in FIG. 1 illustrated by a dotted arrow denoted by CN, to the server 150. The congestion notification is formed of one or more data packets generated by the intermediate node 110 and addressed to the server. As further explained below, the congestion notification may be generated as an on-path message formed of one or more data packets which appear as originating from the client 10, by providing them with similar characteristics as the data packets used for conveying the data from the client 10 to the server 150.

In addition, the intermediate node 110 may also include a congestion indication into the data packet as forwarded to the client 10. For example, if the data packet received from the server 150 is not already ECN marked, the intermediate node 110 may ECN mark the data packet before forwarding it to the client 10. This ECN marking is then echoed by the client 10 in the data transmitted back to the server 150. That is to say, the client 10 also ECN marks one or more of the data packets which are transmitted back to the server 150 in response to the data packets received from the server 150. The server 150 may then use the congestion indication provided by the ECN marking of the data packets from the client 10 for confirming the congestion notification from the intermediate node 110.

In the illustrated concepts, the congestion notification further includes verification information enabling the server 150 to identify to which data packet transmitted from the server 150 the congestion notification relates. Based on the identification of the packet affected by the congestion, the server 150 may perform congestion control in a precise manner. For example, the server 150 may identify to which packet flow the data packet affected by the congestion belongs and then initiate one or more actions to resolve the congestion with respect to this packet flow, e.g., by reducing a rate of sending the data packets of the packet flow. In some scenarios, the server 150 could also identify that the data packet affected by the congestion belongs to a packet flow carrying prioritized data. In this case, the actions initiated by the server 150 to resolve the congestion could also be initiated with respect to another packet flow having lower priority, e.g., by reducing a rate of sending the data packets of the lower priority packet flow. In each case, the information about the data packet affected by the congestion may help the server 150 to perform congestion control in a targeted manner.

The verification information included in the congestion notification may include a part of the data packet affected by the congestion, e.g., a sequence number of the data packet and/or a pre-defined part of a payload of the data packet. Alternatively or in addition, the verification information included in the congestion notification may include a cryptographic hash of the data packet affected by the congestion or a cryptographic hash of a pre-defined part of the data packet affected by the congestion.

Further, the congestion notification may include an identifier of the intermediate node 110. This identifier may be based on a digital signature. Using the identifier, the server 150 can verify that the congestion notification is from a trusted entity. For enabling verification of the digital signature, the server 150 a public key certificate assigned to the intermediate node 110 may be provided to the server 150. This could be accomplished in one or more initial messages transmitted from the intermediate node 110 to the server 150. It is not necessary to include the public key certificate assigned to the intermediate node 110 in each congestion notification.

As mentioned before, the data packets transmitted from the client 10 back to the server 150 may be used for confirming the congestion notification generated by the intermediate node 110. In this case, the verification information included in the congestion notification also enables the server 150 to identify that the congestion indication conveyed by the data packets transmitted from the client 10 back to the server 150 relates to the same data packet as the congestion notification generated by the intermediate node 110. For example, in response to receiving the ECN marked data packet, the client 10 may send an ECN marked ACK data packet back to the server 150. In this case, the server 150 may use the verification information to identify that the congestion notification from the intermediate node 110 and the ACK data packet relate to the same data packet from the server 150. The server 150 may thus use the ACK data packet to confirm validity of the congestion notification from the intermediate node 110.

Depending on whether the congestion notification from the intermediate node 110 is confirmed, the server 150 may adapt the congestion control performed on the basis of the congestion notification from the intermediate node 110. For example, in response to one or more congestion notifications from the intermediate node 110 not being confirmed, the server 150 may decide to disregard future congestion notifications from the intermediate node 110.

Figure 2A:
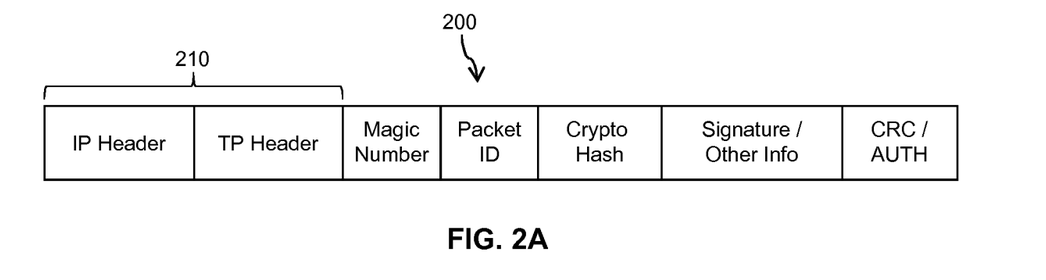
FIG. 2A illustrates an exemplary format of a congestion notification data packet according to an embodiment of the invention.

FIG. 2A shows an exemplary format of the congestion notification. In the exemplary format of FIG. 2, the congestion notification is conveyed in a single data packet, in the following also referred to as congestion notification data packet 200. As illustrated, the congestion notification data packet 200 includes a header section 210 with an IP header and a TP header, and various fields referred to as "Magic Number", "Packet ID", "Crypto Hash", "Signature/other info", "CRC/AUTH".

Figure 2B:
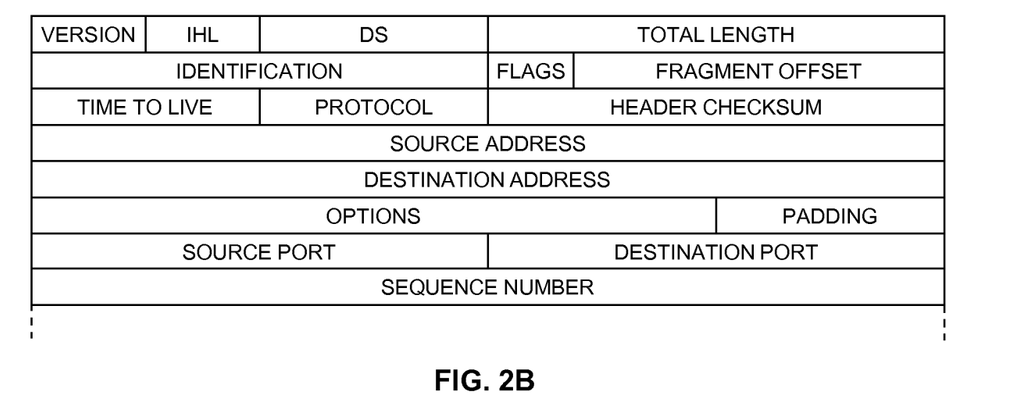
FIG. 2B illustrates an exemplary structure of a header section of the congestion notification data packet.

FIG. 2B schematically illustrates the format of the header section 210 when using data packets of the IPv4 (IP version 4) type. As illustrated, a header section of the data packets includes several information fields, which are referred to as "Version", "IHL (IP Header Length)", "DS", "Total Length", "Identification", "Flags", "Fragment Offset", "Time to Live", "Protocol", "Header Checksum" "Source Address", "Destination Address", "Options", and "Padding". Details concerning these fields are defined in IETF RFC 791 (September 1981). The information field termed as "DS", i.e., "Differentiated Services" is further defined in IETF RFC 2474 (December 1998). In addition, the header section 210 also includes information fields which are referred to as "Source Port" and "Destination Port", as for example defined for TCP in IETF RFC 793.

Figure 2C:
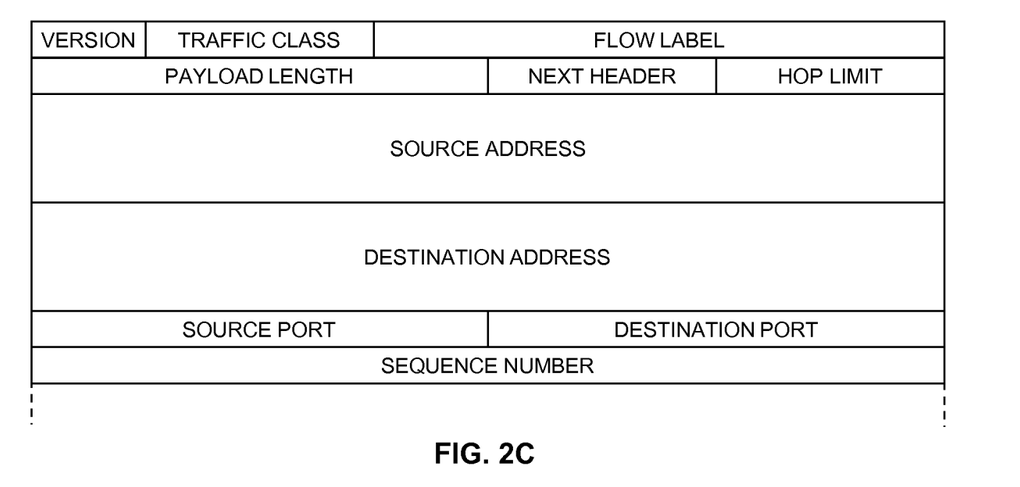
FIG. 2C illustrates a further exemplary structure of a header section of the congestion notification data packet.

FIG. 2C schematically illustrates the format of the header section 210 when using data packets of the IPv6 (IP version 6) type. Again, the header section includes a number of information fields, which are referred to as "Version", "Traffic Class", "Flow Label", "Payload Length", "Next Header", "Hop Limit", "Source Address", and "Destination Address". Details concerning these fields are defined in IETF RFC 8200 (July 2017). In addition, the header section also includes information fields termed as "Source Port" and "Destination Port", as for example defined for TCP in IETF RFC 793.

In the header section 210 as described above, the information field "Source Address" indicates the IP address from which a data packet originates. Similarly, the information field "Destination Address" indicates the IP address for which the data packet is destined. In IPv4, the source address and the destination address are 32 bit values. In IPv6, the source address and the destination address are 128 bit values. The information field "Source Port" indicates an output port at the source of the data packet, whereas the information field "destination port" indicates an input port at the destination point of the data packet.

On the basis of the source address, the destination address, the source port, and the destination port, a packet flow can be defined as a flow of data packets between a first endpoint defined by the source address and the source port, and a second endpoint defined by the destination address and the destination port. In IPv6, a packet flow may also be identified by a value of the above-mentioned flow label field, i.e., data packets with the same value of the flow label field may be identified as being part of the same flow.

In the congestion notification data packet 200, the IP header and the TP header may be substantially identical to the IP header and TP header of the data packets transmitted from the client 10 back to the server 150. Accordingly, the destination address field of the congestion notification data packet 200 may indicate the IP address of the server 150, the source address field of the congestion notification data packet 200 may indicate the IP address of the client 10. Further, the destination port field may indicate the same port number as a source port field of the data packet affected by the congestion as received from the server 150, i.e., the output port used at the server 150, and the source port field may indicate the same port number as a destination port field of the data packet affected by the congestion as received from the server 150, i.e., the input port used at the client 10.

The TP header may also include a checksum field. In the congestion notification data packet 200, the checksum field may be set to a specific byte-string to distinguish the congestion notification data packet 200 from other data packets transmitted from the client 10 to the server 150. Alternatively, an extension header as for example defined in TCP may contain a specific value to identify to distinguish the congestion notification data packet 200 from other data packets transmitted from the client 10 to the server 150.

Alternatively or in addition to using the checksum field or extension header of the TP header, the field "Magic number" to distinguish the congestion notification data packet 200 from other data packets transmitted from the client 10 to the server 150. For example, the field "Magic number" may include a pre-defined number which identifies the congestion notification data packet 200 as a data packet signalling congestion information. The pre-defined number in the field "Magic number" may be selected sufficiently large to reduce the likelihood of having the same pattern in the corresponding part of a data packet transmitted from the client 10 to the server 150. The pre-defined number in the field "Magic number" allows for efficiently distinguishing the congestion notification data packet 200 from other data packets transmitted from the client 10 to the server 150, e.g., by a hardware implemented comparison. Specifically, the server 150 may classify data packets which do not include the pre-defined number in the field "Magic number" as regular data packets transmitted from the client 10 to the server 150. The field "Magic number" may also be used to identify a protocol version used for communication between the intermediate node 110 and the server 150. For example, multiple pre-defined numbers may be used, each corresponding to a different protocol version for communication between the intermediate node 110 and the server 150.

The field "Packet ID" may include an identifier of the data packet affected by the congestion, e.g., a sequence number of the data packet affected by the congestion. The field "Crypto Hash" may include a cryptographic hash of the data packet affected by the congestion or a cryptographic hash of a pre-defined part of the data packet affected by the congestion, e.g., a cryptographic hash of a payload section of the data packet affected by the congestion. As described above, the identifier of the data packet affected by the congestion and/or the cryptographic hash may be used as verification information.

The field "Signature/other info" may include a digital signature of the intermediate node 110. The digital signature may be used for authentication and optionally also for conveying other information from the intermediate node 110 to the server 150. The field "Signature/other info" may be of variable size. If the of the field "Signature/other info" is too large to be included in congestion notification data packet 200, the field "Signature/other info" may be segmented into two or more segments and transmitted in multiple congestion notification data packets 200.

The field "CRC/AUTH" may include a cyclic redundancy check value of the congestion notification data packet 200 and/or other authentication information to be used for integrity protection/authentication of the congestion notification data packet 200.

Figure 3:
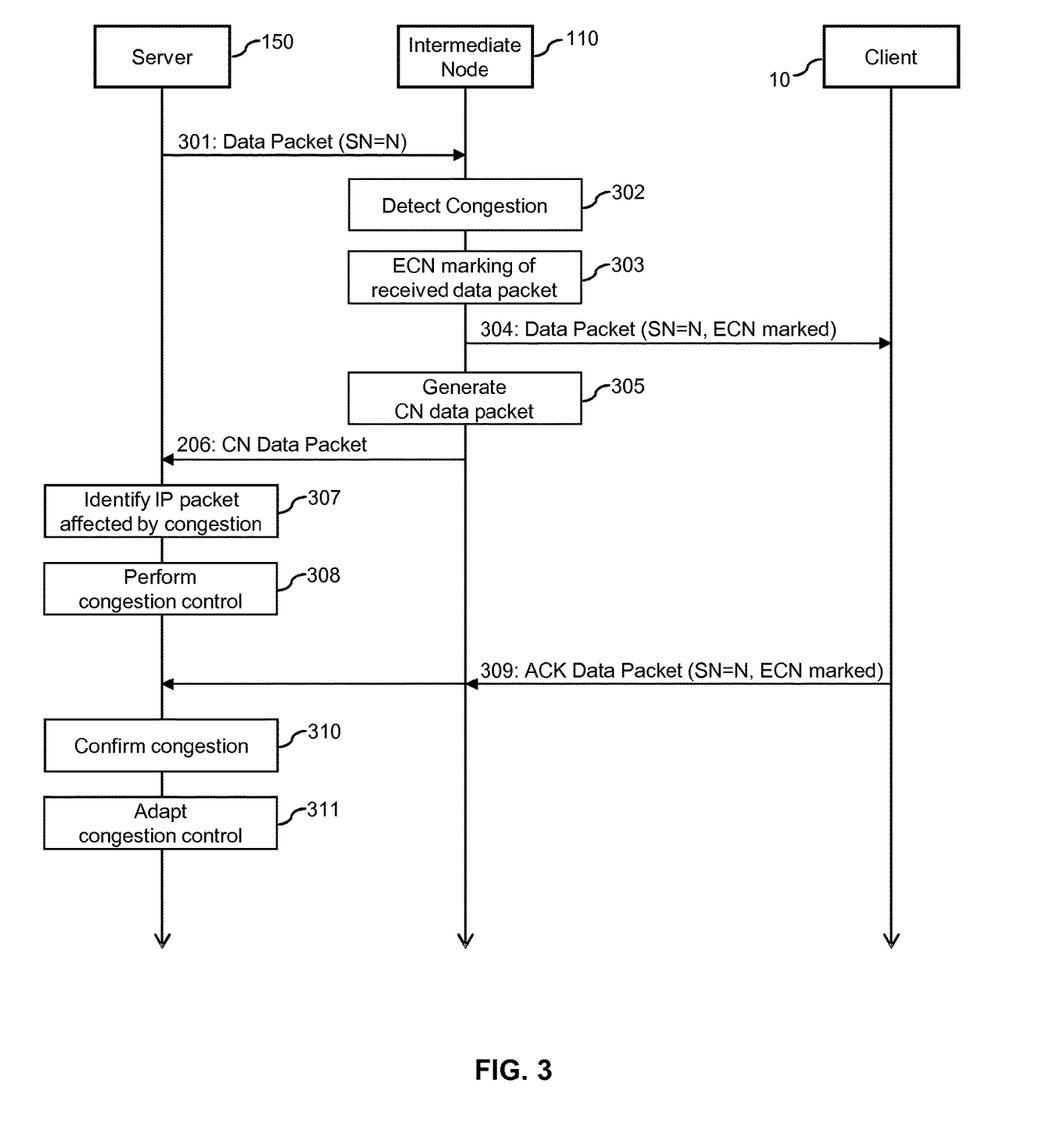
FIG. 3 illustrates an example of processes according to an embodiment of the invention.

FIG. 3 shows an example of processes which are based on the above-described concepts. The processes of FIG. 3 involve the server 150, the intermediate node 110 and the client 10. In the example of FIG. 3, it is assumed that the server 150 transmits data to the client 10, using TCP/IP data packets.

In the processes of FIG. 3, the server 150 sends a data packet 301 towards the client 10. The data packet 301 is assumed to be part of a packet flow and, within the packet flow, be identified by a sequence number SN=N.

The intermediate node 110 receives the data packet 301. As illustrated by block 302, the intermediate node 110 detects that there is a congestion affecting the data packet 301. For example, the intermediate node 110 may check a fill level of a queue provided for forwarding the data packets from the intermediate node 110 to the client 10. In response to the fill level being above a threshold, the intermediate node 110 may identify that there is a congestion on the data path from the intermediate node 110 to the client 10. As mentioned above, the intermediate node 110 may correspond to an access node of a RAN part of the communication network, such as an eNB or gNB. In this case, the queue may for example be defined on an RLC (radio link control) layer. Alternatively or in addition, the intermediate node 110 may also detect the congestion on the basis of an ECN marking of the data packet 301 as received from the server 150. For example, if there is a congestion on the data path between the server 150 and the intermediate node 110, the data packet 301 as received by the intermediate node 110 may already be ECN marked. Based on this ECN marking, the intermediate node 110 may then identify the data packet 301 as being affected by congestion.

If the received data packet 301 was not already ECN marked, the intermediate node 110 may ECN mark the received data packet 301, as illustrated by block 303. Accordingly, in the example of FIG. 3 the data packet 304 as forwarded from the intermediate node 110 to the client 10 is ECN marked to indicate the congestion.

As illustrated by block 305, the intermediate node 110 also generates a congestion notification (CN) data packet 306, which is sent from the intermediate node 110 to the server 150. The CN data packet 306 indicates the congestion detected by the intermediate node 110. The intermediate node 110 generates the CN data packet 306 on the basis of information from the data packet 301. As explained above, the CN data packet 306 includes verification information for enabling the server 150 to identify the data packet 301 as being affected by the congestion. For example, the CN data packet 306 may include the sequence number SN of the data packet 301 and/or a hash value of at least a part of the data packet 301. For example, the CN data packet 306 could include the sequence number SN of the data packet 301 and a hash value of a payload section of the data packet 301.

The CN data packet 306 is addressed to the server 150, i.e., to an IP address corresponding to the source of the data packet 301. More specifically, the intermediate node 110 may generate the CN data packet 306 in such a way that has similar characteristics like a data packet from the client 10 to the server 150. For this purpose, the destination address field of the CN data packet 306 may indicate the IP address of the server 150, and a source address field of the CN data packet 306 may indicate the IP address of the client 10. Further, a destination port field of the CN data packet 306 may indicate the same port number as the source port field of the data packet 301, and a source port field of the CN data packet 306 may indicate the same port number as the destination port field of the data packet 301. By generating the CN data packet 306 with similar characteristics like a data packet from the client 10 to the server 150, the CN data packet 306 can be reliably conveyed to the server 150, without a risk of being blocked by a firewall or the like.

In the example of FIG. 3, the intermediate node 110 first forwards the ECN marked data packet 304 to the client 10, and then generates the CN data packet 306. In this way, signalling of the detected congestion by the ECN marking can be accelerated. For generating the CN data packet 306, the intermediate node 110 may duplicate received the data packet 301, e.g., using an optical splitter. However, it would also be possible to first generate the CN data packet 306 and then forward the ECN marked data packet 304 to the client 10.

Having received the CN data packet 306, the server uses the verification information included in the CN data packet 306 to identify that the indicated congestion relates to the data packet 301, as indicated by block 307. Based on identifying that the indicated congestion relates to the data packet 301, the server 150 performs congestion control, as indicated by block 308. For example, this may involve that the server 150 reduces a sending rate of data packets of the flow to which the data packet 301 belongs. The adaptation of the sending rate may depend on a weight assigned to the CN data packet 306. A higher weight of the CN data packet 306 may for example result in a stronger reduction of the sending rate. In some cases, the reduction of the sending rate may also be initiated in response to a number of CN data packets from the intermediate node 110 exceeding a threshold.

As further illustrated, the client 10 receives the ECN marked data packet 304 forwarded by the intermediate node 110 and responds by sending an ACK data packet 309 to the client 10. The ACK data packet 309 confirms that the data packet 304 was successfully received by the client 10. Further, the ACK data packet echoes the ECN marking of the data packet 304. That is to say, also the ACK data packet 309 is ECN marked. In the example of FIG. 3, the ACK data packet 309 is forwarded by the intermediate node 110 to the server 150.

As can be seen, the CN data packet 306 arrives earlier at the server 150 than the ACK data packet 309. Accordingly, the server 150 can use the CN data packet 306 to perform the congestion control with low latency. Further, the server 150 may use the congestion indication conveyed by the ACK data packet 309 to confirm validity of the CN data packet 306 is valid, as indicated by block 310. Depending on whether the validity of the CN data packet 306 is confirmed, the server 150 may adapt the congestion control. For example, in response to the validity not being confirmed, the server 150 may disregard future CN data packets from the intermediate node 110. Further, if the congestion control performed at block 308 depends on a weight assigned to the CN data packets from the intermediate node 110, this weight could be adjusted depending on whether the congestion(s) indicated by the CN data packet 306 is confirmed by the congestion indication conveyed by the ACK data packet 309. If the congestion is confirmed, the weight may be increased, and if the congestion is not confirmed, the weight may be decreased. Further, if the congestion control at block 308 involves that an action to resolve the congestion, e.g., the above-mentioned reduction of the sending rate, is initiated in response to a number of CN data packets from the intermediate node 1100 exceeding a threshold, this threshold could be adapted depending on whether the congestion indicated by the CN data packet 306 is confirmed by the congestion indication conveyed by the ACK data packet 309. If the congestion is confirmed, the threshold could be lowered. If the congestion is not confirmed, the threshold may be raised.

In the above examples, the communication between the intermediate node 110 and the server 150, in particular the transmission of the congestion notification from the intermediate node 110 to the server 150, may be based on an on-path cooperation protocol, such as PLUS (Path Layer UDP Substrate Specification), described in IETF document "draft-trammell-plus-spec", (December 2016). However, other standardized or proprietary protocols could be used as well. Further, it is noted that the data packet(s) conveying the congestion notification could also be used for conveying additional information from the intermediate node 110 to the server 150, information about the characteristics of the data path from the intermediate node 110 to the client 10, e.g., in terms of an indication of available bandwidth or link quality. This information may also be used as input for the congestion control performed by the server.

Figure 4:
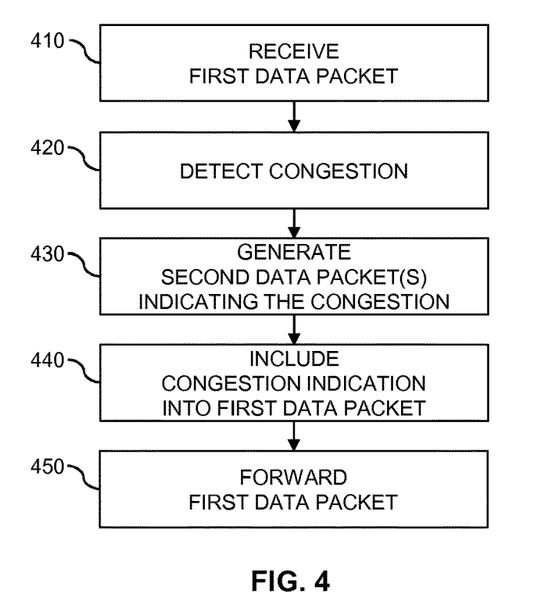
FIG. 4 shows a flowchart for schematically illustrating a congestion handling method according to an embodiment of the invention, which may be implemented by an intermediate network node forwarding data packets.

FIG. 4 shows a flowchart for illustrating a method of congestion handling in a communication network. The method of FIG. 4 may be utilized for implementing the illustrated concepts in a node of the communication network, such as the above-mentioned intermediate node 110. If a processor-based implementation of the node is used, the steps of the method may be performed and/or controlled by one or more processors of a device or system implementing the node. Such device or system may also include a memory storing program code for implementing the below described functionalities or steps of the method.

At step 410, the node may receive a first data packet from a server, such as the above-mentioned server 150. The above-mentioned data packet 301 is an example of such first data packet. The node is responsible for forwarding the data packet to a client. For example, the node may be a node of a RAN part of the communication network, through which the client is connected to the communication network. For example, the node could be an eNB of the LTE technology, a gNB of the 5G technology, or a similar type of access node.

At step 420, the node detects a congestion affecting the first data packet. Here, it is noted that the congestion may be detected after the node receives the first data packet, but also before the node receives the first data packet. For example, the node may detect the congestion on the basis of a marking of the first data packet a received from the server, e.g., on the basis of an ECN marking. Further, the node may detect that a fill level of a queue used for temporarily storing the first data packet before forwarding to the client 10 is above a threshold. The latter condition could also be detected before the node receives the first data packet.

At step 430, the node generates at least one second data packet addressed to the server. The above-mentioned congestion notification data packets 200, 306 are examples of such at least one second data packet. The at least one second data packet indicating the congestion detected at step 420. The at least one second data packet includes verification information enabling the server to verify that the indicated congestion relates to the first data packet.

The verification information may include a part of the first data packet, e.g., a pre-defined part of a payload section of the first data packet. In addition or as an alternative, the verification information may include a hash value of at least a part of the first data packet, e.g., hash value of a pre-defined part of a payload section of the data packet or a hash value of the entire first data packet. In addition or as an alternative, the verification information may include a sequence number of the first data packet.

Further, the at least one second data packet may include an identifier of the node. The identifier may be based on or include a digital signature assigned to the node.

The at least one second data packet may include a source address field indicating an address of the client, and a destination address field indicating an address of the server. Further, the at least one second data packet may include a source port field indicating an output port of the client and a destination port field indicating an input port of the server. The output port indicated by the at least one second data packet may correspond to an input port as indicated by the first data packet, and the input port indicated by the at least one second data packet may correspond to an output port as indicated by the first data packet.

Further, the at least one second data packet may include an indication enabling the server to identify that the second data packet conveys congestion information. An example of such indication is the above-mentioned pre-defined number provided in the "Magic number" field. Further, such indication could be provided by a pre-defined number in a checksum field of the at least one second data packet or by pre-defined data in a TP header extension of the at least one second data packet.

At step 440, the node may additionally indicate the detected congestion by including a congestion indication into the first data packet as forwarded to the client. For example, the congestion indication may be based on an ECN marking of the first data packet.

At step 450, the node forwards the first data packet to the client. If the congestion indication was included at step 440, the node forwards the first data packet with the included congestion indication to the client.

Figure 5:
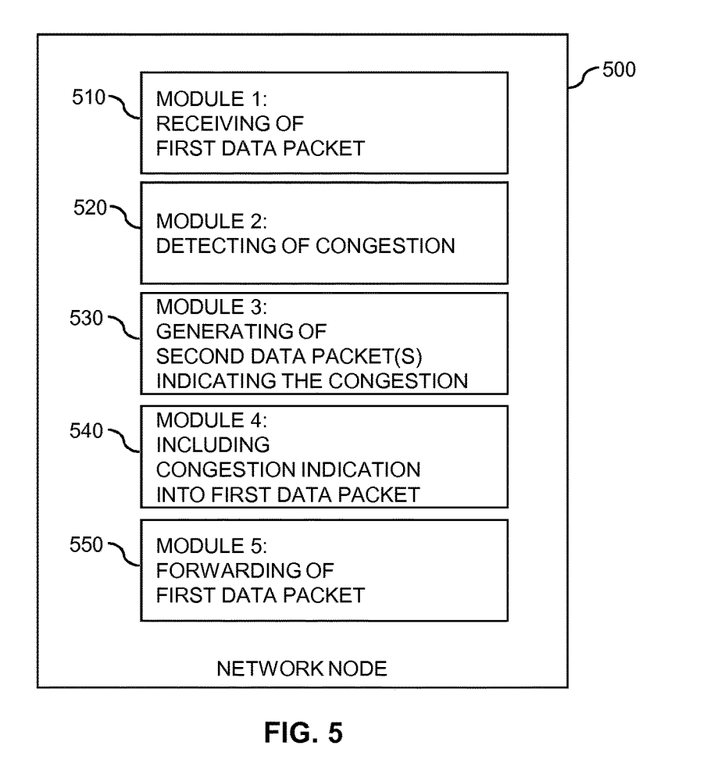
FIG. 5 shows a block diagram for illustrating functionalities of a network node according to an embodiment of the invention.

FIG. 5 shows a block diagram for illustrating functionalities of a network node 500 which operates according to the method of FIG. 4. As illustrated, the network node 500 may be provided with a module 510 configured to receive a first data packet to be forwarded to a client, such as explained in connection with step 410. Further, the network node 500 may be provided with a module 520 configured to detect a congestion affecting the first data packet, such as explained in connection with step 420. Further, the network node 500 may be provided with a module 530 configured to generate at least one second data packet indicating the congestion and including verification information, such as explained in connection with step 430. Further, the network node 500 may be provided with a module 540 configured to include a congestion indication into the first data packet, such as explained in connection with step 440. Further, the network node 500 may be provided with a module 450 configured to forward the first data packet to the client, such as explained in connection with step 450.

It is noted that the network node 500 may include further modules for implementing other functionalities, such as known functionalities of an eNB, gNB, or similar access node. Further, it is noted that the modules of the network node 500 do not necessarily represent a hardware structure of the network node 500, but may also correspond to functional elements, e.g., implemented by hardware, software, or a combination thereof.

Figure 6:
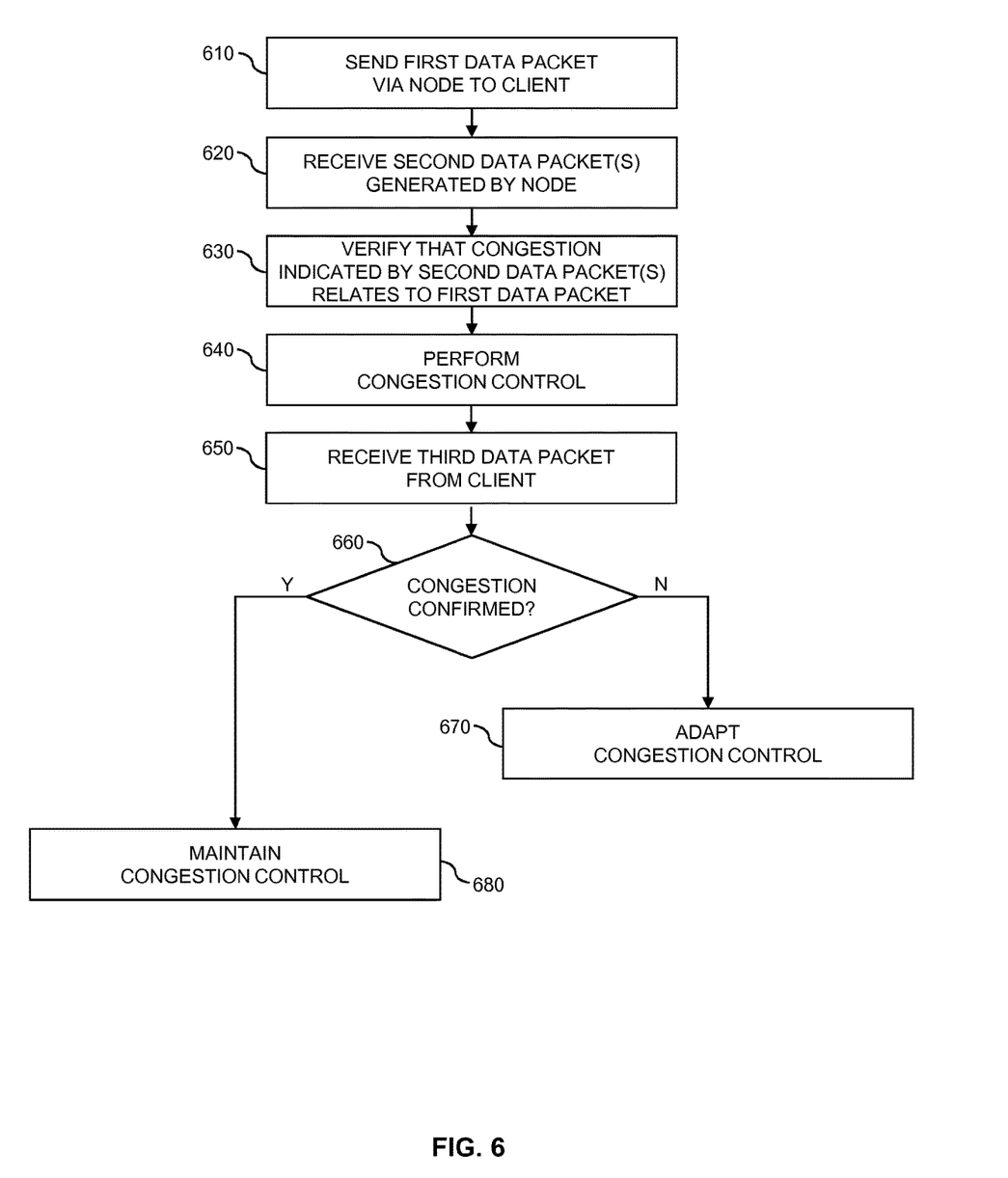
FIG. 6 shows a flowchart for schematically illustrating a congestion handling method according to an embodiment of the invention, which may be implemented by a server sending data packets via an intermediate network node.

FIG. 6 shows a flowchart for illustrating a further method of congestion handling in a communication network. The method of FIG. 6 may be utilized for implementing the illustrated concepts in a server, such as the above-mentioned server 150. If a processor-based implementation of the server is used, the steps of the method may be performed and/or controlled by one or more processors of a device or system implementing the server. Such device or system may also include a memory storing program code for implementing the below described functionalities or steps of the method.

At step 610, the server sends a first data packet to a client. This is accomplished via an a node of the communication network, such as the above-mentioned intermediate node 110. The above-mentioned data packet 301 is an example of such first data packet. The node is responsible for forwarding the data packet to the client. For example, the node may be a node of a RAN part of the communication network, through which the client is connected to the communication network. For example, the node could be an eNB of the LTE technology, a gNB of the 5G technology, or a similar type of access node.

At step 620, the server receives at least one second data packet. The at least one second data packet is generated by the node of the communication network and is addressed to the server. The at least one second data packet indicates a congestion affecting the first data packet. The above-mentioned congestion notification data packets 200, 306 are examples of such at least one second data packet.

The at least one second data packet includes verification information. The verification information may include a part of the first data packet, e.g., a pre-defined part of a payload section of the first data packet. In addition or as an alternative, the verification information may include a hash value of at least a part of the first data packet, e.g., hash value of a pre-defined part of a payload section of the data packet or a hash value of the entire first data packet. In addition or as an alternative, the verification information may include a sequence number of the first data packet.

Further, the at least one second data packet may include an identifier of the node. The identifier may be based on or include a digital signature assigned to the node.

The at least one second data packet may include a source address field indicating an address of the client, and a destination address field indicating an address of the server. Further, the at least one second data packet may include a source port field indicating an output port of the client and a destination port field indicating an input port of the server. The output port indicated by the at least one second data packet may correspond to an input port as indicated by the first data packet, and the input port indicated by the at least one second data packet may correspond to an output port as indicated by the first data packet.

Further, the at least one second data packet may include an indication enabling the server to identify that the second data packet conveys congestion information. An example of such indication is the above-mentioned pre-defined number provided in the "Magic number" field. Further, such indication could be provided by a pre-defined number in a checksum field of the at least one second data packet or by pre-defined data in a TP header extension of the at least one second data packet.

At step 640, the server performs congestion control based on identifying, from the verification information included in the second data packet, that the indicated congestion relates to the first data packet. The congestion control performed by the server may involve initiating one or more actions to resolve the indicated congestion, e.g., by adapting a rate of sending data packets. For example, the first data packet may be part of a packet flow between the server and the client, and the congestion control may involve adapting a rate of sending the data packets of the packet flow. The adaptation of the rate of sending data packets may depend on a weight assigned to the at least one second data packet and/or on other information conveyed by the at least one second data packet, e.g., information on severity of the indicated congestion and/or information on a link between the node and the client, e.g., in terms of an available bandwidth and/or link quality. In the case of using a weight, a higher weight may then result in a stronger reduction of the rate of sending the data packets. Furthermore, an action to resolve the congestion indicated by the at least one second data packet may also be initiated in response to a number of congestion notification data packets from the node exceeding a threshold.

At step 650, the server may receive a third data packet from the client. The third data packet includes a congestion indication confirming the congestion affecting the first data packet. The third data packet may be an acknowledgement data packet generated by the client in response to receiving the first data packet. The congestion indication included in the third data packet may be based on an ECN marking of the third data packet. The above-mentioned ACK data packet 309 is an example of such third data packet.

As illustrated by steps 660, 670, and 680, the server may adapt the congestion control depending on the congestion indication. Specifically, at step 660 the server may check whether the congestion indicated by the at least one second data packet received at step 620 was confirmed. If this is not the case, as indicated by branch "N", the server may proceed to step 670 and adapt the congestion control. For example when receiving future congestion notification data packets generated by the node, the adapted congestion control may disregard these data packets. If the congestion indicated by the at least one second data packet received at step 620 was confirmed, as indicated by branch "Y", the server may proceed to step 680 and maintain the congestion control, i.e., also use future congestion notification data packets generated by the node as a basis of the congestion control.

Alternatively or in addition to disregarding congestion notification data packets generated by the node if the indicated congestion is not confirmed, the congestion control may also be adapted if the congestion indication included in the third data packet confirms the congestion indicated by the at least one second data packet. For example, a weight could be assigned to the congestion notification data packets generated by the node, and this weight could be adjusted depending on whether the congestion(s) indicated by these congestion notification data packets are confirmed. If the congestion(s) is/are confirmed, the weight may be increased, and if the congestion(s) is/are not confirmed, the weight may be decreased. Furthermore, if an action to resolve the congestion indicated by the at least one second data packet is initiated in response to a number of congestion notification data packets from the node exceeding a threshold, this threshold could be adapted depending on whether there congestion(s) indicated by the congestion notification data packets are confirmed. If the congestion(s) is/are confirmed, the threshold may be lowered. If the congestion(s) is/are not confirmed, the threshold may be raised.

Figure 7:
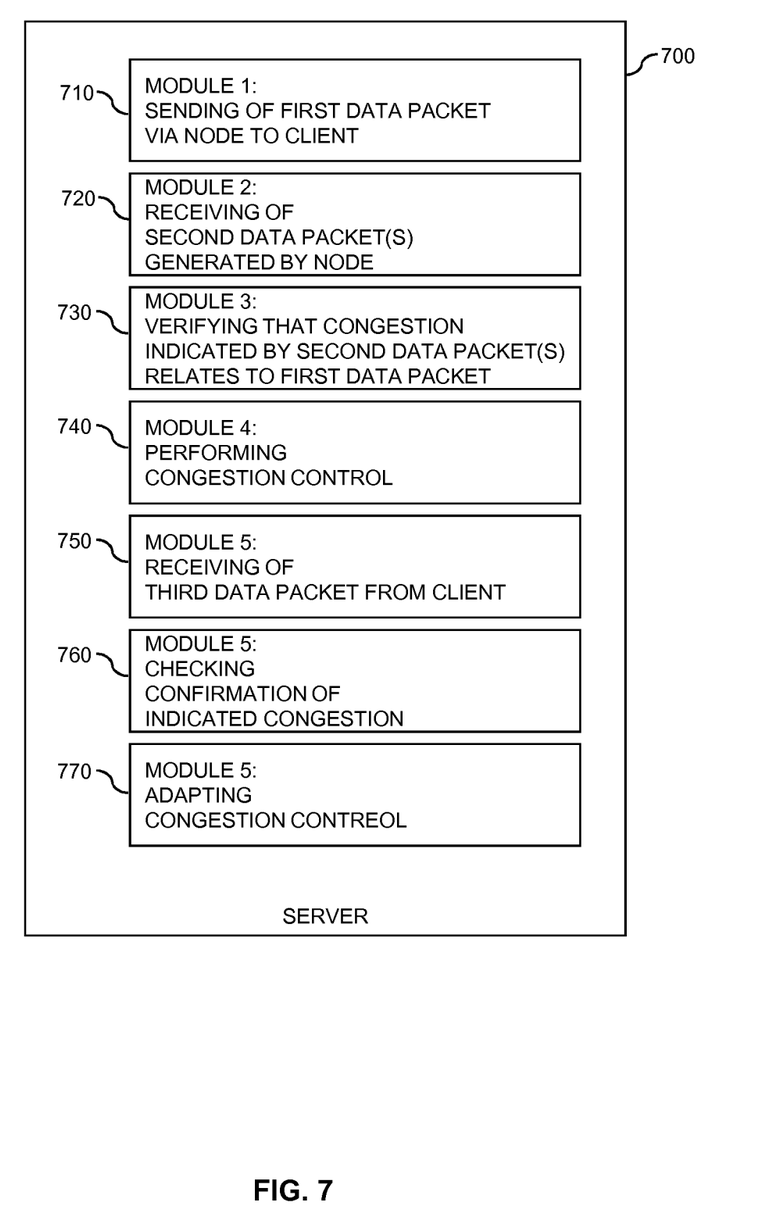
FIG. 7 shows a block diagram for illustrating functionalities of a server according to an embodiment of the invention.

FIG. 7 shows a block diagram for illustrating functionalities of a server 700 which operates according to the method of FIG. 6. As illustrated, the server 700 may be provided with a module 710 configured to send a first data packet via a node of a communication network to a client, such as explained in connection with step 610. Further, the server 700 may be provided with a module 720 configured to receive at least one second data packet generated by the node, such as explained in connection with step 620. Further, the server 700 may be provided with a module 730 configured to verify, from verification information included in the at least one second data packet, that a congestion indicated by the at least one second data packet relates to the first data packet, such as explained in connection with step 730. Further, the server 700 may be provided with a module 740 configured to perform congestion control, such as explained in connection with step 640. Further, the server 700 may be provided with a module 750 configured to receive a third data packet with a congestion indication, such as explained in connection with step 650. Further, the server 700 may be provided with a module 770 configured to adapt the congestion control depending on the congestion indication received with the first data packet, such as explained in connection with steps 660, 670, and 680.

It is noted that the server 700 may include further modules for implementing other functionalities, such as known functionalities of a file or media server. Further, it is noted that the modules of the server 700 do not necessarily represent a hardware structure of the server 700, but may also correspond to functional elements, e.g., implemented by hardware, software, or a combination thereof.

The methods of FIG. 4 and FIG. 6 may also be combined in a system including a node operating according to the method of FIG. 4 and a server operating according to the method of FIG. 6. In the system, the server would send the first data packet via the node the client, receive the at least one second data packet addressed from the node, and perform congestion control based on identifying, from the verification information included in the second data packet, that the indicated congestion relates to the first data packet. The node would forward the first data packet to the client, detect the congestion affecting the first data packet, and generate the at least one second data packet. Optionally, the system could also include the client.

Figure 8:
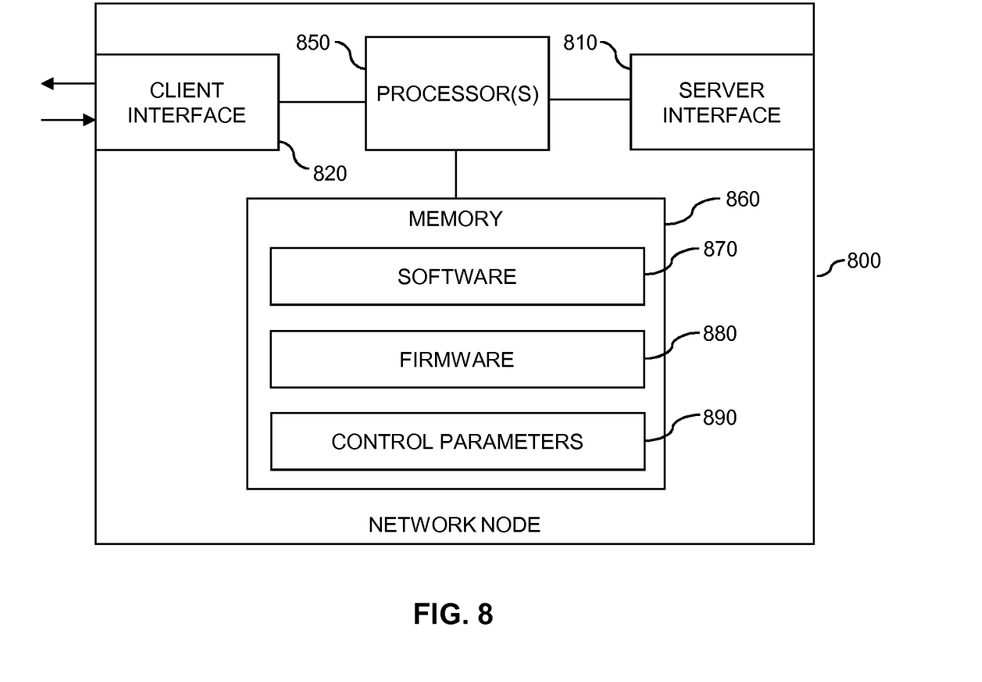
FIG. 8 schematically illustrates structures of a network node according to an embodiment of the invention.

FIG. 8 illustrates a processor-based implementation of a network node 800 which may be used for implementing congestion handling in accordance with the above described concepts. For example, the structures as illustrated in FIG. 8 may be used for implementing the concepts in the above-mentioned intermediate node 110.

As illustrated, the network node 800 may include a server interface 810 and a client interface 820. If the network node 800 corresponds to a radio access node, such as an eNB or gNB, the client interface 820 may correspond to a radio interface.

Further, the network node 800 may include one or more processors 850 coupled to the interfaces 810, 820 and a memory 860 coupled to the processor(s) 850. By way of example, the interfaces 810, 820, the processor(s) 850, and the memory 860 could be coupled by one or more internal bus systems of the network node 800. The memory 860 may include a Read-Only-Memory (ROM), e.g., a flash ROM, a Random Access Memory (RAM), e.g., a Dynamic RAM (DRAM) or Static RAM (SRAM), a mass storage, e.g., a hard disk or solid state disk, or the like. As illustrated, the memory 860 may include software 870, firmware 880, and/or control parameters 890. The memory 860 may include suitably configured program code to be executed by the processor(s) 850 so as to implement the above-described functionalities of a network node, such as explained in connection with FIG. 4.

It is to be understood that the structures as illustrated in FIG. 8 are merely schematic and that the network node 800 may actually include further components which, for the sake of clarity, have not been illustrated, e.g., further interfaces or processors. Also, it is to be understood that the memory 860 may include further program code for implementing known functionalities of an eNB, gNB, or similar access node. According to some embodiments, also a computer program may be provided for implementing functionalities of the network node 800, e.g., in the form of a physical medium storing the program code and/or other data to be stored in the memory 860 or by making the program code available for download or by streaming.

Figure 9:
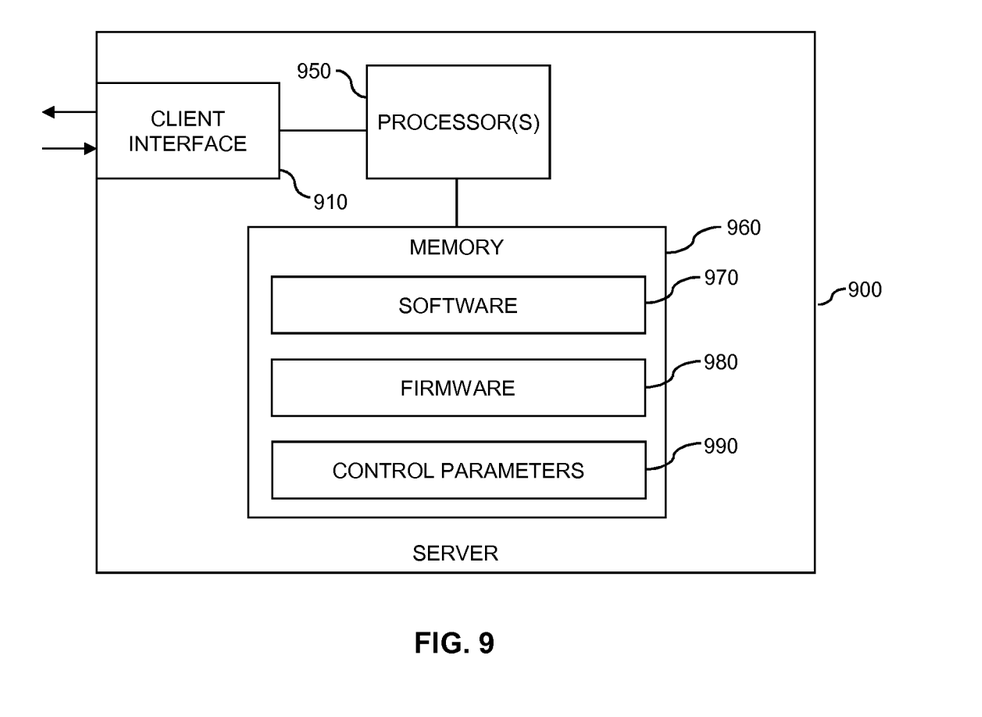
FIG. 9 schematically illustrates structures of a server according to an embodiment of the invention.

FIG. 9 illustrates a processor-based implementation of a server 900 which may be used for implementing congestion handling in accordance with the above described concepts. For example, the structures as illustrated in FIG. 8 may be used for implementing the concepts in the above-mentioned server 150.

As illustrated, the server 900 may include a client interface 910, e.g., an IP based interface for communicating with one or more clients.

Further, the server 900 may include one or more processors 950 coupled to the client interface 910 and a memory 960 coupled to the processor(s) 950. By way of example, the client interface 910, the processor(s) 950, and the memory 960 could be coupled by one or more internal bus systems of the server 900. The memory 960 may include a ROM, e.g., a flash ROM, a RAM, e.g., a DRAM or SRAM, a mass storage, e.g., a hard disk or solid state disk, or the like. As illustrated, the memory 960 may include software 970, firmware 980, and/or control parameters 990. The memory 960 may include suitably configured program code to be executed by the processor(s) 950 so as to implement the above-described functionalities of a server, such as explained in connection with FIG. 6.

It is to be understood that the structures as illustrated in FIG. 9 are merely schematic and that the server 900 may actually include further components which, for the sake of clarity, have not been illustrated, e.g., further interfaces or processors. Also, it is to be understood that the memory 960 may include further program code for implementing known functionalities of a server, e.g., known functionalities of a file server or media server. According to some embodiments, also a computer program may be provided for implementing functionalities of the server 900, e.g., in the form of a physical medium storing the program code and/or other data to be stored in the memory 960 or by making the program code available for download or by streaming.

As can be seen, the concepts as described above may be used for implementing efficient and reliable congestion handling with low latency. The concepts may be implemented without requiring modifications at the client side. Further, the concepts may also be applied in connection with encrypted data traffic between the server and the client, without requiring decryption at the intermediate node. The server may decide in a flexible manner how to utilize the congestion notification generated by the intermediate node. If the server considers the congestion notification generated by the intermediate node as unreliable, the server may decide to base the congestion control on ECN markings of data packets generated by the client.

It is to be understood that the examples and embodiments as explained above are merely illustrative and susceptible to various modifications. For example, the illustrated concepts may be applied in connection with various kinds of communication technologies, without limitation to the LTE technology or a 5G technology. For example, the concepts could also be applied in connection with a WLAN based communication technology or a wire-based communication technology. Further, it is to be understood that the illustrated concepts may be applied in connection with various TP types, without limitation to the above-mentioned example of using TCP. For example, the concepts could also be applied in connection with the SCTP (Stream Control Transmission Protocol) as specified in RFC 4960 (September 2007) or the QUIC (Quick UDP Internet Connections) as for example described in IETF document "draft-ietf-quic-transport-08" (Dec. 5, 2017). Moreover, it is to be understood that the above concepts may be implemented by using correspondingly designed software to be executed by one or more processors of an existing device, or by using dedicated device hardware. Further, it should be noted that the illustrated nodes or devices may each be implemented as a single device or as a system of multiple interacting devices or cloud platform.

The invention claimed is:

1. A method of handling congestion in a communication network, the method comprising:
   a node of the communication network forwarding a first data packet to a client, the first data packet having a source address field containing an address allocated to a server and a destination address field containing an address allocated to the client;
   the node detecting a congestion affecting the first data packet;
   the node generating a second data packet addressed to the server; and
   the node transmitting the second data packet towards the server, wherein
   the second data packet comprises a first indicator indicating the detected congestion and a packet identifier identifying the first packet, and
   generating the second data packet comprises:
   creating an Internet Protocol (IP) packet header and including in a destination address field of the IP packet header the address that was contained in the source address field of the first packet;
   creating a transport layer packet header; and
   creating a transport layer payload and including in the transport layer payload the packet identifier identifying the first data packet, wherein
   the second data packet comprises the IP header, followed by the transport layer packet header, followed by the transport layer payload comprising the packet identifier identifying the first data packet.

2. The method of claim 1, wherein the second data packet further comprises an identifier of the node and the identifier comprises a digital signature.

3. The method of claim 1, wherein the second data packet comprises:
   a source address field indicating an address of the client;
   a source port field indicating an output port of the client;

a destination address field indicating an address of the server; and
a destination port field indicating an input port of the server, the output port corresponding to an input port as indicated by the first data packet and the input port corresponding to an output port as indicated by the first data packet.

4. The method of claim 1, wherein the second data packet further comprises a second indicator indicating that the second data packet conveys congestion information, wherein the second indicator is separate from the first indicator and the verification information.

5. The method of claim 1, wherein the node is a node of a radio access network part of the communication network.

6. A non-transitory computer readable medium storing a computer program comprising instructions for configuring a network node to perform the method of claim 1.

7. A method of handling congestion in a communication network, the method comprising:
a server sending a first data packet via a node of the communication network to a client the first data packet comprising a source address field containing an address allocated to the server and a destination address field containing an address allocated to the client;
the server receiving a second data packet generated by the node of the communication network, the second data packet comprising a congestion indicator indicating a congestion affecting the first data packet and a packet identifier identifying the first data packet; and
the server performing congestion control based on identifying, from the packet identifier comprised in the second data packet, that the indicated congestion relates to the first data packet, wherein
the second data packet comprises an Internet Protocol (IP) header comprising a destination address field containing the address that was contained in the source address field of the first packet, followed by a transport layer packet header, followed by a transport layer payload comprising the packet identifier identifying the first data packet.

8. The method of claim 7, comprising:
the server receiving a third data packet from the client, the third data packet comprising a congestion indication confirming the congestion affecting the first data packet; and
depending on the congestion indication, the server adapting the congestion control.

9. The method of claim 8, wherein the third data packet is an acknowledgement data packet generated by the client in response to receiving the first data packet.

10. The method of claim 7, wherein the second data packet comprises:
a source address field indicating an address of the client;
a source port field indicating an output port of the client;
a destination address field indicating an address of the server; and
a destination port field indicating an input port of the server, the output port corresponding to an input port as indicated by the first data packet and the input port corresponding to an output port as indicated by the first data packet.

11. The method of claim 7, wherein the second data packet further comprises a second indicator indicating that the second data packet conveys congestion information, wherein the second indicator is separate from the first indicator and the verification information.

12. A non-transitory computer readable medium storing a computer program comprising instructions for configuring a server to perform the method of claim 7.

13. A network node for handling congestion in a communication network comprising a client communicating with a server, the network node comprising:
memory; and
processing circuitry, coupled to the memory, the processing circuitry being configured to:
transmit a first data packet towards the client, the first data packet comprising: a source address field soring containing an address allocated to the server, a source port field containing a source port value, a destination address filed containing an address allocated to the client, and a destination port field containing a destination port value,
detect congestion related to the first data packet;
generate a second data packet addressed to the server, and
transmit the second data packet towards the server, wherein
the second data packet comprises a first indicator indicating that the node detected the congestion and a packet identifier identifying the first data packet, and
the network node is configured to generate the second data packet by performing a process that comprises:
creating an Internet Protocol (IP) packet header and including in a destination address field of the IP packet header the address that was contained in the source address field of the first packet;
creating a transport layer packet header; and
creating a transport layer payload and including in the transport layer payload the packet identifier identifying the first data packet, wherein
the second data packet comprises the IP header, followed by the transport layer packet header, followed by the transport layer payload comprising the packet identifier identifying the first data packet.

14. The network node of claim 13, wherein the second data packet further comprises an identifier of the network node and the identifier comprises a digital signature.

15. The network node of claim 13, wherein the second data packet comprises:
a source address field containing the address allocated to the client;
a source port field containing the destination port value;
a destination address field containing the address allocated to the server; and
a destination port field containing the source port value.

16. The network node of claim 13, wherein the second data packet further comprises a second indicator indicating that the second data packet conveys congestion information, wherein the second indicator is separate from the first indicator and the verification information.

17. The network node of claim 13, wherein the network node is a node of a radio access network.

18. A server for providing a service to a client via a network node, the server comprising:
memory; and
processing circuitry, coupled to the memory, the processing circuitry being configured to:
send a first data packet towards the client, the first data packet comprising a source address field containing an address allocated to the server and a destination address field containing an address allocated to the client;

receive a second data packet generated by the network node, the second data packet comprising a congestion indicator indicating a congestion affecting the first data packet and
a packet identifier identifying the first data packet; and
perform congestion control based on identifying, from the packet identifier comprised in the second data packet, that the indicated congestion relates to the first data packet, wherein
the second data packet comprises an Internet Protocol (IP) header comprising a destination address field containing the address that was contained in the source address field of the first packet, followed by a transport layer packet header, followed by a transport layer payload comprising the packet identifier identifying the first data packet.

19. The server of claim 18, wherein the server is configured to adapt the congestion control in response to receiving a third data packet comprising a congestion indication confirming the congestion affecting the first data packet.

20. The server of claim 18, wherein
the first data packet comprises: a source address field storing an address allocated to the server, a source port field containing a source port value, a destination address filed containing an address allocated to the client, and a destination port field containing a destination port value, and
the second data packet generated by the network node comprises: a source address field containing the address allocated to the client; a source port field containing the destination port value; a destination address field containing the address allocated to the server; and a destination port field containing the source port value.

21. A method of handling congestion in a communication network, the method comprising:
a node of the communication network receiving a first data packet transmitted by a sender, the first data packet having a source address field containing an address allocated to the sender and a destination address field containing an address allocated to the client;
the node detecting congestion affecting the first data packet;
in response to detecting the congestion, the node generating a second data packet comprising: (i) information indicating that the node has detected congestion and (ii) a packet identifier identifying the first packet; and
the node transmitting the second data packet towards the sender, wherein generating the second data packet comprises:
creating an Internet Protocol (IP) packet header and including in a destination address field of the IP packet header the address that was contained in the source address field of the first packet;
creating a transport layer packet header; and
creating a transport layer payload and including in the transport layer payload the packet identifier identifying the first data packet, wherein
the second data packet comprises the IP header, followed by the transport layer packet header, followed by the transport layer payload comprising the packet identifier identifying the first data packet.

22. The method of claim 21, wherein
the first packet comprises a sequence number, and
the packet identifier included in the transport layer payload of the second data packet is said sequence number.

* * * * *